(12) United States Patent
Mizuno et al.

(10) Patent No.: US 12,461,673 B2
(45) Date of Patent: Nov. 4, 2025

(54) COMPUTER SYSTEM AND MANAGEMENT METHOD FOR COMPUTER SYSTEM

(71) Applicant: HITACHI, LTD., Tokyo (JP)

(72) Inventors: Makio Mizuno, Tokyo (JP); Takahiro Yamamoto, Tokyo (JP); Yoshinori Ohira, Tokyo (JP); Norio Shimozono, Tokyo (JP); Takeru Chiba, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/598,112

(22) Filed: Mar. 7, 2024

(65) Prior Publication Data

US 2025/0103225 A1 Mar. 27, 2025

(30) Foreign Application Priority Data

Sep. 25, 2023 (JP) .................. 2023-160204

(51) Int. Cl.
*G06F 3/06* (2006.01)

(52) U.S. Cl.
CPC .......... *G06F 3/0632* (2013.01); *G06F 3/0604* (2013.01); *G06F 3/067* (2013.01)

(58) Field of Classification Search
None
See application file for complete search history.

(56) References Cited

U.S. PATENT DOCUMENTS

2020/0052961 A1\* 2/2020 Soryal ................ H04L 41/0873
2022/0052910 A1 2/2022 Neelakantam et al.

\* cited by examiner

*Primary Examiner* — Brian R Peugh
(74) *Attorney, Agent, or Firm* — Foley & Lardner LLP

(57) ABSTRACT

In a computer system including a plurality of storage nodes and a control node, in a case where a storage system is deployed to a new storage node, the control node templates configuration information of an existing storage node by using a template deployment service, the control node sets a plurality of initial setting nodes, and causes the plurality of initial setting nodes to perform in parallel initial setting of converting and storing data of the existing storage node by using the template in a plurality of disks to be connected to a new storage node, and the new storage node is connected to the disks in which the initial setting is performed, and imports configuration information of the existing storage so that the storage system is deployed.

4 Claims, 15 Drawing Sheets

COMPUTER SYSTEM AND MANAGEMENT METHOD FOR COMPUTER SYSTEM

BACKGROUND OF THE INVENTION

1. Field of the Invention

The present invention relates to a computer system and a management method for the computer system.

2. Description of the Related Art

An information processing system including a plurality of storage nodes on which one or a plurality of software defined storage (SDS) is implemented is known. In the following description, the SDS refers to a storage device formed by mounting software having a storage function on a general-purpose server device.

According to such a technology, it is possible to close the reading processing of the control information in the server, so that there is an advantage that high performance can be achieved while maintaining the reliability.

On the other hand, in recent years, a cloud (particularly, a public cloud) has become widespread as a platform of an information processing system. In the public cloud, a public cloud vendor develops a service that provides computer resources and storage resources as infrastructure as a service (IaaS).

A user of a public cloud can access a computer service and a storage service on the public cloud through an application programming interface (API), can secure a necessary amount of computer resources and storage resources at a necessary timing, and can quickly change the configuration thereof.

In the cloud, there is a use case in which an application development cycle is early (e.g., Devops), and for example, an application test environment is frequently introduced and reconfigured in accordance with the application development cycle on the storage infrastructure side. Therefore, agility for introduction and reconfiguration of a storage system is required.

In order to prevent the degradation of the performance of the system and for the early start of the introduced storage system, it is desired to provide the disk in an initially set state (with data and data guarantee code (DIF) being filled, and control information being written).

There is an infrastructure as a code (IaC) as a method of efficiently performing provisioning and operation of an IT infrastructure by executing a code described in a template with respect to the agility of introduction and configuration change of a storage system. As a technique using this, US Patent Publication No. 20220052910 discloses a technique of updating a cloud-based storage system using an IaC service. Specifically, one or more performance metrics associated with the cloud-based storage system are monitored, and a configuration template specifying a target state of the storage system is generated based on the monitored performance metrics. Here, the performance metric is IOPS (I/O per second), storage usage, SLA, and latency to IO, and the target state means a state of the storage system including additional cloud computing resources.

In addition, in the storage system, an operation is generally performed in which a configuration of the storage system can be automatically set by executing a setting script.

SUMMARY OF THE INVENTION

In order to prevent the degradation of the performance of the system and for the early start of the storage system, it is necessary to quickly perform initial setting of the disk. In order to ensure reliability of data to be stored in the storage system, a guarantee code is generally assigned to the data to be stored.

However, in the method described above, it is possible to automate the storage configuration setting and provide the drive in an initially set state, but the extension of the construction time may be a problem.

The initial setting of the drive requires not only writing of data and a guarantee code but also control information related to a function of improving performance and availability of the storage system stored in the disk according to the configuration of the storage system. In order to set this control information to the disk, reading and writing relative to the disk are required, but the processing time increases due to the back-end band neck related to the disk processing performance of the virtual machine that can be generally used in the cloud.

Therefore, it is a problem to be solved that the time required to change the construction of the computer system including the storage system, particularly to add the storage node should be decreased.

In order to solve the above problem, one of the representative computer systems of the present invention is a computer system including: a plurality of storage nodes including a processor and forming a storage system using a logical storage area of one or more disks; and a control node including a processor and managing the storage nodes, wherein in a case where a storage system is deployed to a new storage node, the control node templates configuration information of an existing storage node by using a template deployment service, the control node sets a plurality of initial setting nodes, and causes the plurality of initial setting nodes to perform in parallel initial setting of converting and storing data of the existing storage node by using the template in a plurality of disks to be connected to a new storage node, and the new storage node is connected to the disks in which the initial setting is performed, and imports configuration information of the existing storage so that the storage system is deployed.

Further, one of representative management methods of a computer system of the present invention is a management method of a computer system including a plurality of storage nodes including a processor and forming a storage system using a logical storage area of one or more disks, and a control node including a processor and managing the storage nodes, wherein in a case where a storage system is deployed to a new storage node, the control node templates configuration information of an existing storage node by using a template deployment service, the control node sets a plurality of initial setting nodes, and causes the plurality of initial setting nodes to perform in parallel initial setting of converting and storing data of the existing storage node by using the template in a plurality of disks to be connected to a new storage node, and the new storage node is connected to the disks in which the initial setting is performed, and imports configuration information of the existing storage so that the storage system is deployed.

According to the present invention, it is possible to shorten the time required to change the construction of the computer system. The problems, configurations, and effects other than those described above will be clarified by the following description of embodiments.

DESCRIPTION OF THE PREFERRED EMBODIMENTS

Figure 1:
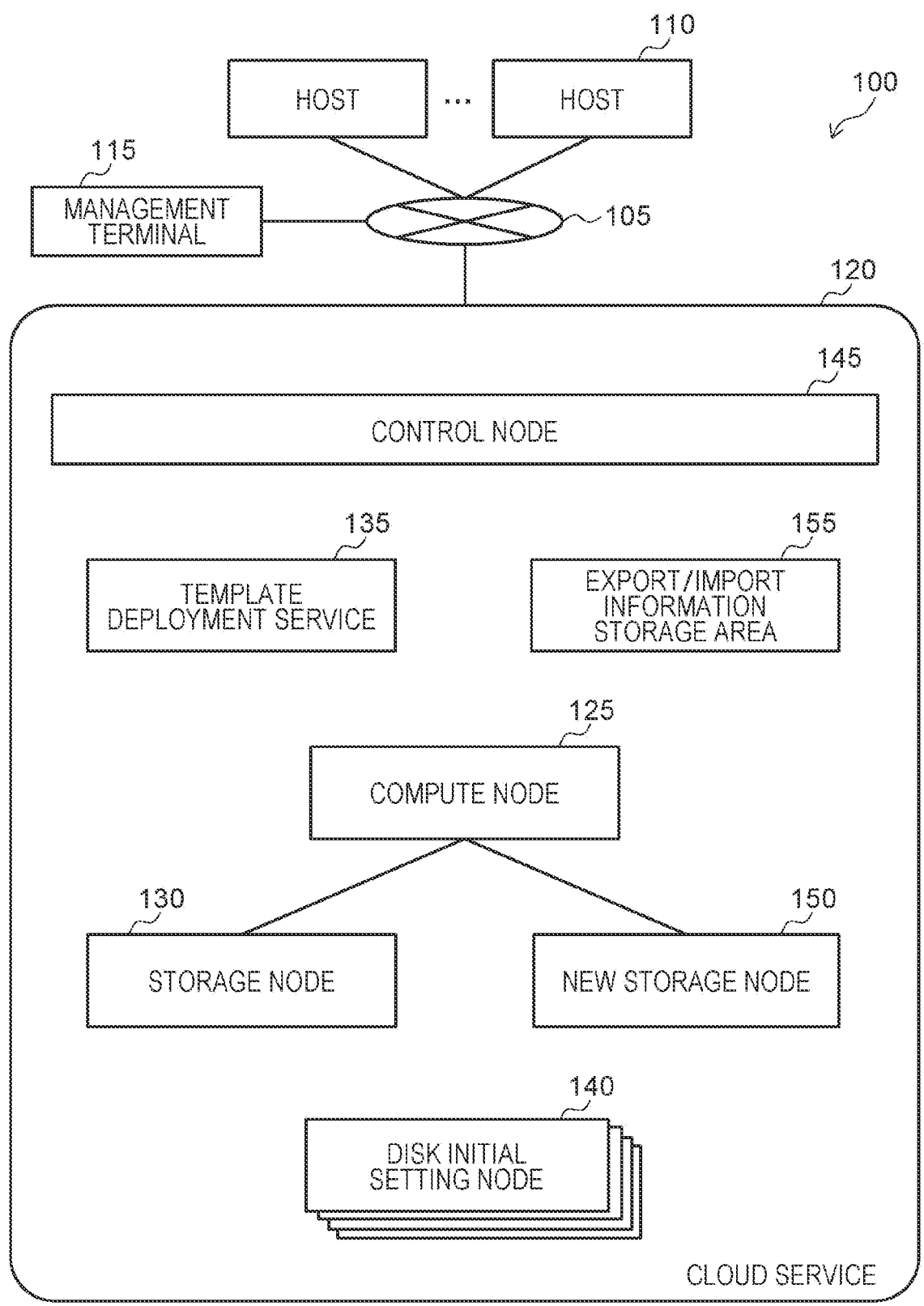
FIG. 1 is a diagram illustrating an overall structure of an information processing system including a storage system.

Hereinafter, embodiments of the present invention will be described with reference to the drawings.

Note that, in the following description, various types of information may be described with an expression such as a "management table", but the various types of information may be expressed with a data structure other than a table. In addition, the "management table" can be referred to as "management information" to indicate that it does not depend on the data structure.

In addition, the process may be described with a "program" as a subject. The program is executed by a processor, for example, a central processing unit (CPU), and performs predetermined process. Note that, since the process is appropriately performed using a storage resource (for example, a memory) and a communication interface device (for example, a communication port), the subject of the process may be a processor. The processor may include dedicated hardware in addition to the CPU.

The computer program may be installed in each computer from a program source. The program source may be provided by, for example, a program distribution server or a storage medium.

In addition, each element can be identified by a number or the like, but another type of identification information such as a name may be used as long as it is identifiable information. In the drawings and the description of the present invention, the same parts are denoted by the same reference numerals, but the present invention is not limited to this embodiment, and all application examples that conform to the idea of the present invention are included in the technical scope of the present invention. In addition, unless otherwise specified, each component may be plural or singular.

First Embodiment

FIG. 1 is a diagram illustrating a configuration of an information processing system 100 according to the present embodiment. The information processing system 100 includes a plurality of hosts 110, a management terminal 115, and a cloud service 120 connected to each other via a network 105 including, for example, Ethernet (registered trademark) or a local area network (LAN). The cloud service 120 includes a plurality of compute nodes 125, a plurality of storage nodes 130, a plurality of disk initial setting nodes 140, a template deployment service 135, an export/import information storage area 155, and a new storage node 150.

The host 110 is a general-purpose computer device used by a cloud service user to use the cloud service.

The management terminal 115 is a terminal operated by a system administrator of the cloud service to be used. For example, the system administrator accesses a control node 145 in the cloud service to be described later from the management terminal 115, and instructs the storage node 130 to export the storage configuration information. The storage configuration information is information related to a volume provided as logical storage information of the compute node.

The compute node 125 is a virtual computer device that transmits a read request or a write request (hereinafter, appropriately collectively referred to as an input/output (I/O) request) to the storage node in response to a user operation or a request from a mounted application program. Although the compute node is constructed in the computer providing service in the present embodiment, the compute node may be configured outside the cloud service similarly to the host.

The storage node 130 is a physical or a virtual server device that provides a storage area for reading and writing data relative to the compute node 125. The storage node 130 associates the physical storage area of the storage device with the logical storage area of the disk, creates a virtual storage system using the logical storage area of one or a plurality of disks, and provides the logical storage area of the storage system to the compute node 125.

The template deployment service 135 is a service that provides a template in which a system deployed in a cloud service is coded and reads the template to deploy the system in the cloud service. Major cloud service vendors offer such services.

The export/import information storage area 155 is an area for storing information necessary for constructing a test environment when the test environment of the storage node 130 is deployed on a cloud service, for example. The export/import information storage area 155 is provided in, for example, an object storage provided by a cloud service provider.

For example, when a test environment of the storage node 130 is deployed on a cloud service, the disk initial setting node 140 performs initial setting for causing a disk that is a storage area to be usable. Note that the disk initial setting node 140 does not need to be operated at all times, and may be operated only while the initial setting of the disk connected to the new storage node 150 is performed. Therefore, the disk initial setting node 140 may delete the disk from the cloud service after completing the initial setting of the disk connected to the new storage node 150.

The new storage node 150 is, for example, a test environment of the storage node 130 deployed on a cloud service. In a case where a plurality of disks are connected to the new storage node 150, the plurality of disk initial setting nodes 140 are associated with the plurality of disks on a one-to-one basis.

The block storage providing service is a service that provides a virtual or physical storage device to a computer device provided by a computer providing service, for example, a storage node via a network for a block storage providing service. Note that the network for the block storage providing service may be the same as the network, or may be virtually separated using a technology such as a virtual local area network (VLAN).

The physical storage device includes one or a plurality of types of large-capacity nonvolatile storage devices such as a SAS (serial attached SCSI (small computer system interface)) SSD (solid state drive), a NVMe (non-volatile memory express) SSD, a SAS hard disk drive, or a SATA (serial ATA (advanced technology attachment)) hard disk drive, and provides a physical storage area for reading/writing data in response to a read/write request (hereinafter, referred to as an I/O (input/output) request) from a compute node.

The cloud control service is a service in which a system administrator controls a computer providing service and a block storage providing service in the present information processing system. The cloud control service enables addition, deletion, configuration change, and the like of a virtual or physical device provided by each service to be controlled via a network.

Figure 2:
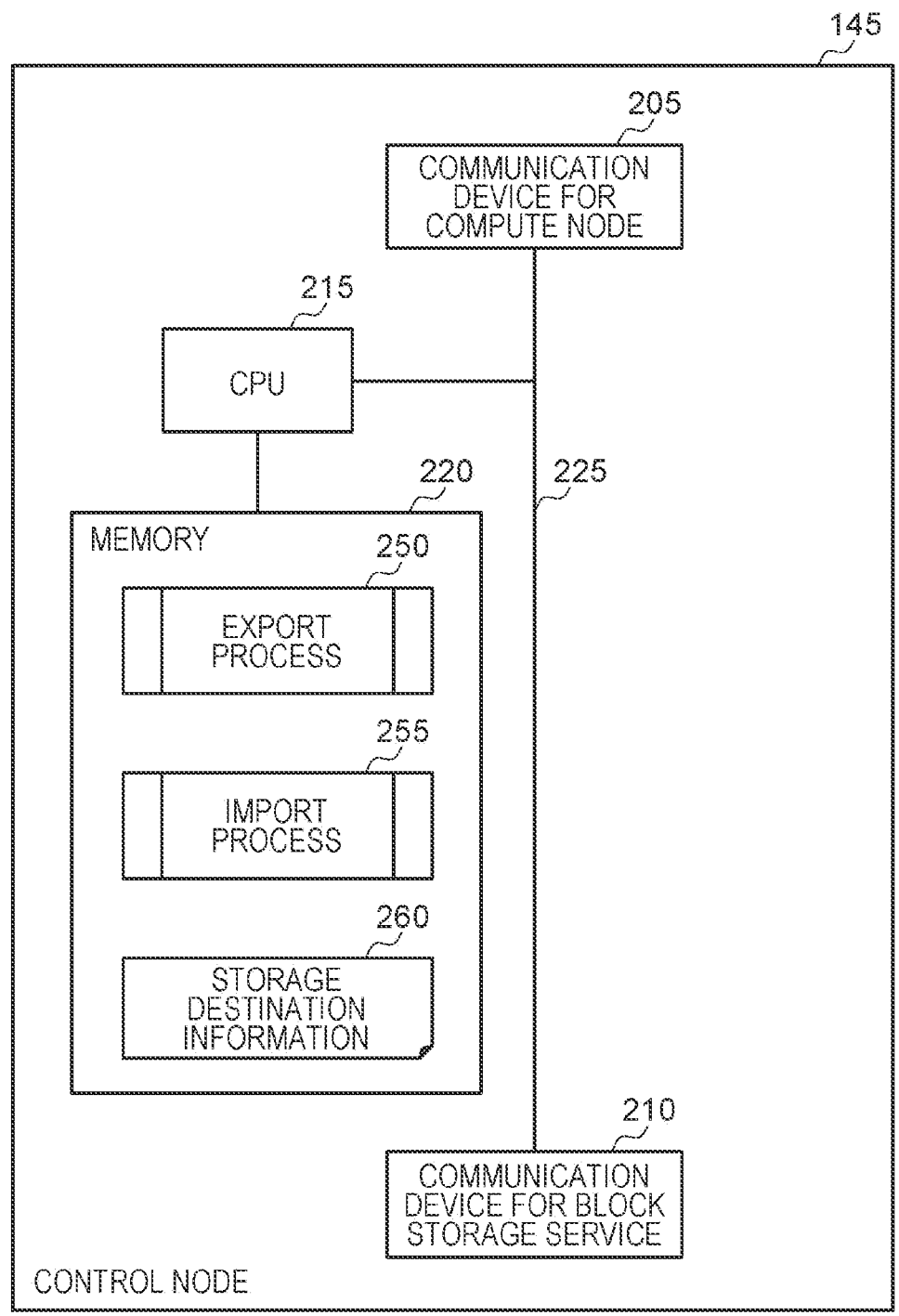
FIG. 2 is a diagram illustrating functional blocks of a control node 145.

FIG. 2 is a diagram illustrating functional blocks of the control node 145.

The control node 145 includes a CPU 215, a memory 220, a communication device for compute node 205, a communication device for block storage providing service 210, and an internal bus 225. The internal bus 225 interconnects the CPU 215, the communication device for compute node 205, and the communication device for block storage providing service 210.

The control node 145 includes one or more CPUs 215, one or more memories 220, one or more communication devices for compute node 205, and one or more communication devices for block storage providing service 210. Each of the CPU 215, the memory 220, the communication device for compute node 205, and the communication device for block storage providing service 210 may be a virtual device. In addition, the communication device for compute node 205 and the communication device for block storage providing service 210 may be physically different communication devices, may be physically the same and logically separated communication devices, or may be physically and logically the same communication device.

The CPU 215 is a processor that controls the operation of the control node 145. The memory 220 includes a volatile semiconductor memory such as an SRAM (static RAM (random access memory)) or a DRAM (dynamic RAM), and is used to temporarily store various programs and necessary data. At least one or more CPUs execute the program stored in the memory to execute various processes as the control node 145 as described later.

The communication device for compute node 205 is an interface for the control node 145 to communicate with a compute node or another storage node via a network, and includes, for example, a NIC (network interface card) or the like. The communication device for compute node 205 performs protocol control at the time of communication with a compute node, another storage node, or a cloud control unit.

Next, a program executed by the control node 145 will be described. The program is stored in the memory 220. The memory 220 includes, as programs, an export process 250, an import process 255, and storage destination information 260 required in the export process 250, and the import process 255.

The export process 250 is, for example, a program for exporting, that is, writing the data on the disk of the storage node 130, storage configuration information, and a template in which the storage node 130 is coded to the export/import information storage area 155 when the test environment of the storage node 130 is deployed on the cloud service as the new storage node 150.

The import process 255 is, for example, a program for importing, that is, reading and setting data and the like in the export/import information storage area written by the export process 250 to the new storage node 150 when the test environment of the storage node 130 is deployed as the new storage node 150 on the cloud service.

The storage destination information 260 is information indicating the storage destination in the export/import information storage area 155 of the template in which the storage node 130 is coded, the storage configuration information, and the data on the disk for the export process 250, and the reference destination of the export/import information storage area referred to for the import process 255 to import and set the new storage node 150. In the export process 250 and the import process 255, the new storage node 150 is deployed from the storage node 130 on the cloud service with reference to the storage destination information 260. Details of the export process 250 and the import process 255 will be described later.

Figure 3:
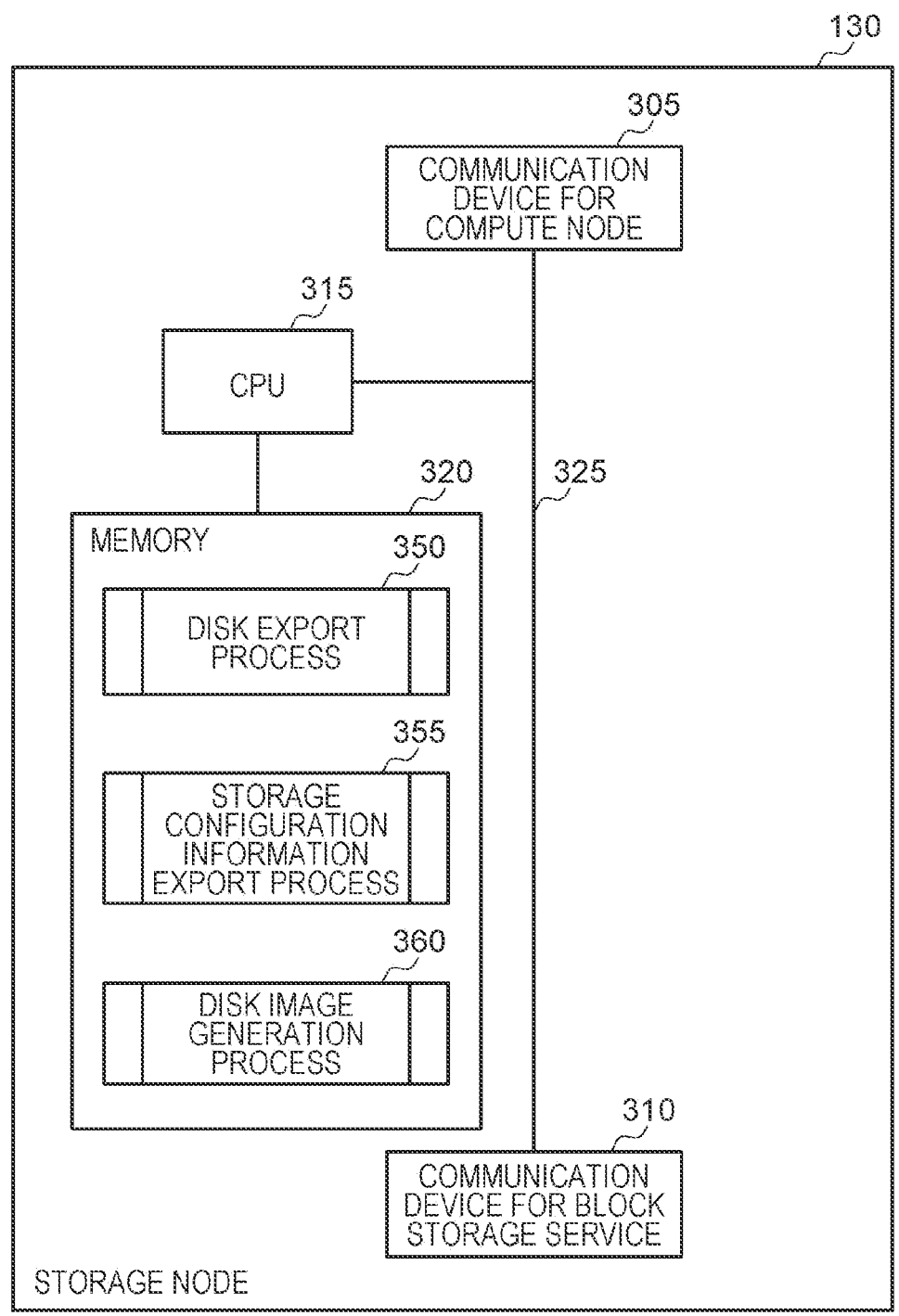
FIG. 3 is a diagram illustrating functional blocks of a storage node 130.

FIG. 3 is a diagram illustrating functional blocks of the storage node 130.

The functional blocks of the storage node 130 are basically the same as the functional blocks of the control node 145. A difference from the control node 145 is a program stored on a memory.

The storage node 130 includes a CPU 315, a memory 320, a communication device for compute node 305, a communication device for block storage providing service 310, and an internal bus 325. The internal bus 325 interconnects the CPU 315, the communication device for compute node 305, and the communication device for block storage providing service 310.

Since the CPU 315, the memory 320, the communication device for compute node 305, the communication device for block storage providing service 310, and the internal bus 325 are the same as the CPU 215, the memory 220, the communication device for compute node 205, the communication device for block storage providing service 210, and the internal bus 225 illustrated in FIG. 2, respectively, the description thereof will be omitted.

Next, a program executed by the storage node 130 will be described. The program is stored in the memory 320. The memory 320 includes, as programs, a disk export process 350, a storage configuration information export process 355, and a disk image generation process 360.

The disk export process 350 includes receiving a disk export instruction from the control node 145, and providing data stored in the disk connected to the storage node 130 stored in the export/import information storage area to the control node 145.

The storage configuration information export process 355 includes providing the storage configuration information stored in the storage node 130 to the control node 145.

The disk image generation process 360 includes in response to the disk image generation instruction from the disk export process 350, reading data of the disk connected to the storage node, generating a disk image of the disk, and notifying the disk export process 350 of the disk image generation completion. Details of the disk export process 350, the storage configuration information export process 355, and the disk image generation process 360 will be described later.

Figure 4:
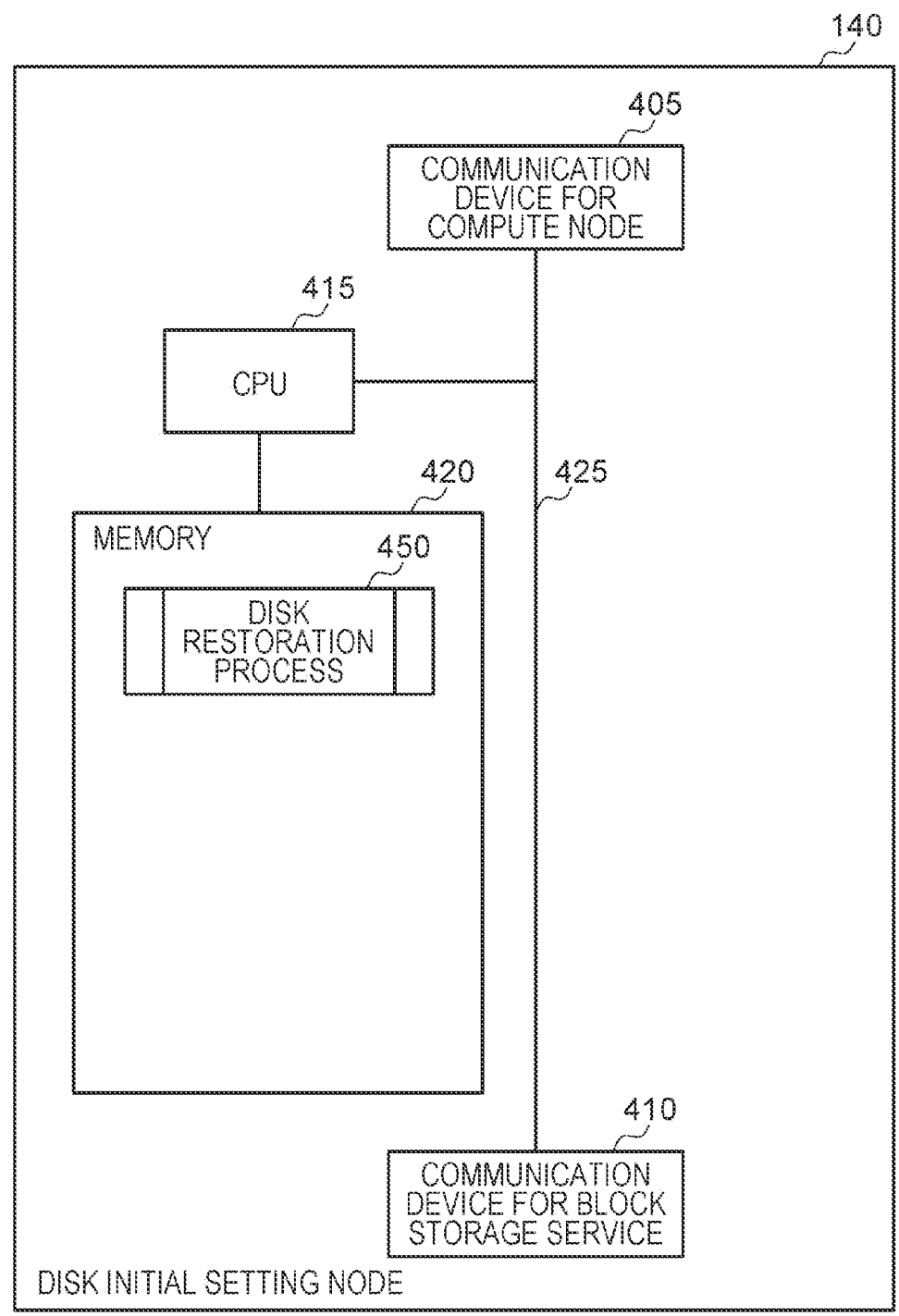
FIG. 4 is a diagram illustrating functional blocks of a disk initial setting node 140.

FIG. 4 is a diagram illustrating functional blocks of the disk initial setting node 140.

The functional blocks of the disk initial setting node 140 are basically the same as the functional blocks of the control node 145. A difference from the control node 145 is a program stored on a memory.

The disk initial setting node 140 includes a CPU 415, a memory 420, a communication device for compute node 405, a communication device for block storage providing service 410, and an internal bus 425. The internal bus 425 interconnects the CPU 415, the communication device for compute node 405, and the communication device for block storage providing service 410.

Since the CPU 415, the memory 420, the communication device for compute node 405, the communication device for block storage providing service 410, and the internal bus 425 are the same as the CPU 215, the memory 220, the communication device for compute node 205, and the communication device for block storage providing service 210, and the internal bus 225 illustrated in FIG. 2, respectively, the description thereof will be omitted.

Next, a program executed by the disk initial setting node 140 will be described. The program is stored in the memory 420. The memory 420 includes a disk restoration process 450.

The disk restoration process 450 includes in response to the disk data restoration instruction from the control node 145, reading the disk image of the disk of the storage node 130 stored in the export/import information storage area, and restores the disk image as data stored in the disk. Note that details of the disk restoration process 450 will be described later.

Figure 5:
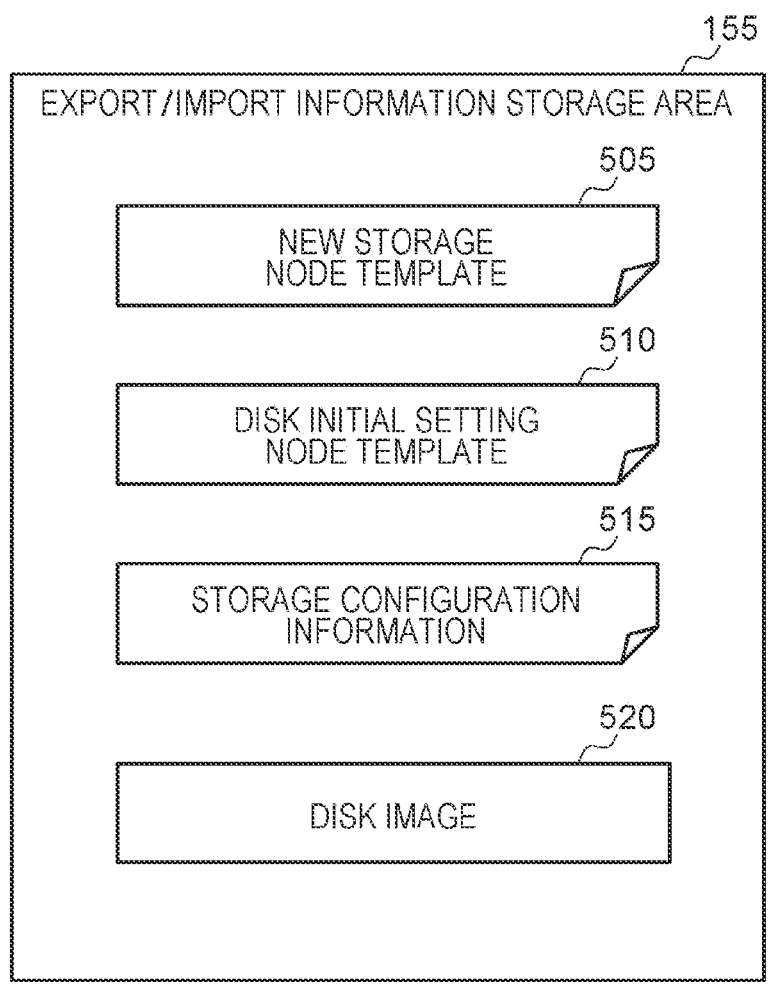
FIG. 5 is a diagram illustrating an export/import information storage area 155.

FIG. 5 is a diagram illustrating the export/import information storage area 155. In the present embodiment, the export/import information storage area 155 stores the new storage node template 505, the disk initial setting node template 510, the storage configuration information 515, and the disk image 520.

The new storage node template 505 describes components of the new storage node when, for example, a test environment of the storage node 130 is deployed as the new storage node 150 on a cloud service. The components include, for example, a virtual machine, an OS operating on the virtual machine, a system disk connected to the virtual machine, a data disk, a network interface, configuration information such as an IP address, an access control rule, and the like.

The disk initial setting node template 510 describes components of a node to be initialized to make a disk connected to the new storage node 150 usable. The components are similar to those of the new storage node template.

The storage configuration information 515 is management information for the storage node to provide a storage area to the host. For example, the information includes volume management information and host path information.

The volume management information stores management information for providing a volume to the compute node using the capacity of the virtual storage device. The host path information is management information that defines to which host the volume managed by the volume management information is provided.

The disk image 520 is a file including data and control information stored in a disk connected to the storage node 130.

Figure 6:
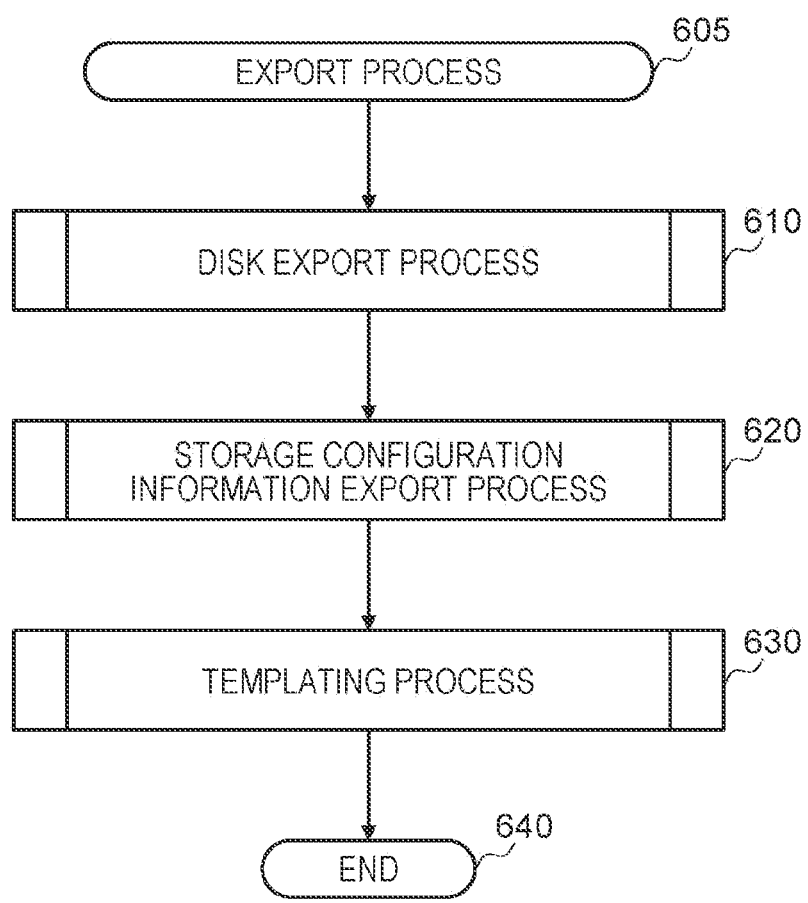
FIG. 6 is a flowchart of an export process 605 executed by the control node 145.

FIG. 6 is a flowchart of the export process 605 executed by the control node 145. According to this procedure, the data on the disk of the storage node, the storage configuration information, and the template describing the components of the storage node are stored in the export/import information storage area provided by the cloud service.

First, in step 610, the export process program of the control node 145 instructs the storage node to create a disk image file including data and control information stored in a disk connected to the storage node, and exports the disk image file created in the storage node to the export/import information storage area 155.

In step 620, the export process program of the control node 145 exports the storage configuration information of the storage node to the export/import information storage area 155.

In step 630, the export process program of the control node 145 outputs an instruction to the template deployment service to export the template describing the components of the storage node to the export/import information storage area 155. The template is a description of resources such as a virtual machine or a disk to be created or set on the cloud service. The template deployment service deploys a resource on the cloud service according to the template.

In step 640, the completion of steps 610, 620, and 630 is waited, and when the completion is completed, the export process 605 ends.

In the flowchart of FIG. 6, steps 610 to 630 are sequentially executed, and the export process 605 ends after completion of all process in step 640. Alternatively, completion may be confirmed in each of steps 610, 620, and 630. The flowchart as illustrated in FIG. 6 is used because the processing time can be shortened by executing each step in parallel.

Figure 7:
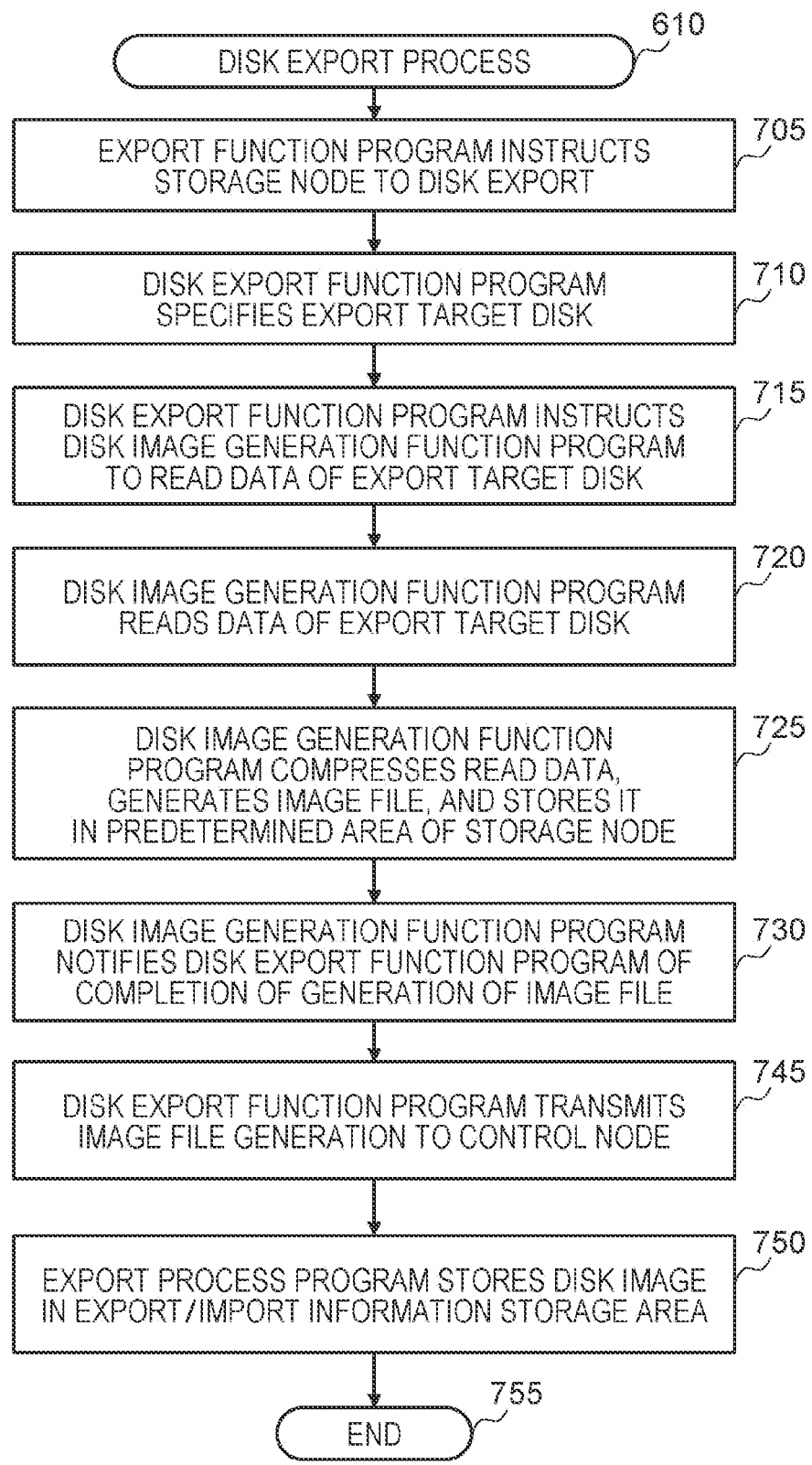
FIG. 7 is a flowchart of a disk export process.

FIG. 7 is a flowchart of the disk export process (step 610). According to this procedure, a disk image is created from the disk of the storage node, and the disk image created by the storage node is exported to the export/import information storage area 155. The disk image is a snapshot of the entire disk including not only user data but also control information.

In step 705, the export process program of the control node 145 instructs the storage node to export a disk.

In step 710, the disk export process program of storage node 130 receives the disk export instruction from control node 145, and specifies an export target disk. The export target disk may be a disk before being connected to the storage node 130, or a disk specified by preparing a management table for export target disk in the storage node 130, setting an export target disk, and referring to the management table for export target disk by the disk export process program.

In step 715, the disk export process program instructs a disk image generation function program to read the data of the export target disk.

In step 720, the disk image generation function program receives the instruction from the disk export process program, and reads the data stored in the export target disk.

In step 725, the disk image generation function program generates a compressed read data as a disk image and stores the disk image in a predetermined area of the storage node 130.

In step 730, the disk image generation function program notifies the disk export function module that the generation of the disk image is completed.

In step 740, the disk export function program receives a notification of completion of generation of the disk image from the disk image generation function program, and transmits the disk image to the control node 145.

In step 750, the export process program of the control node 145 refers to the storage destination information, stores the disk image received from the storage node in a predetermined export/import information storage area, and ends the disk export process.

Figure 8:
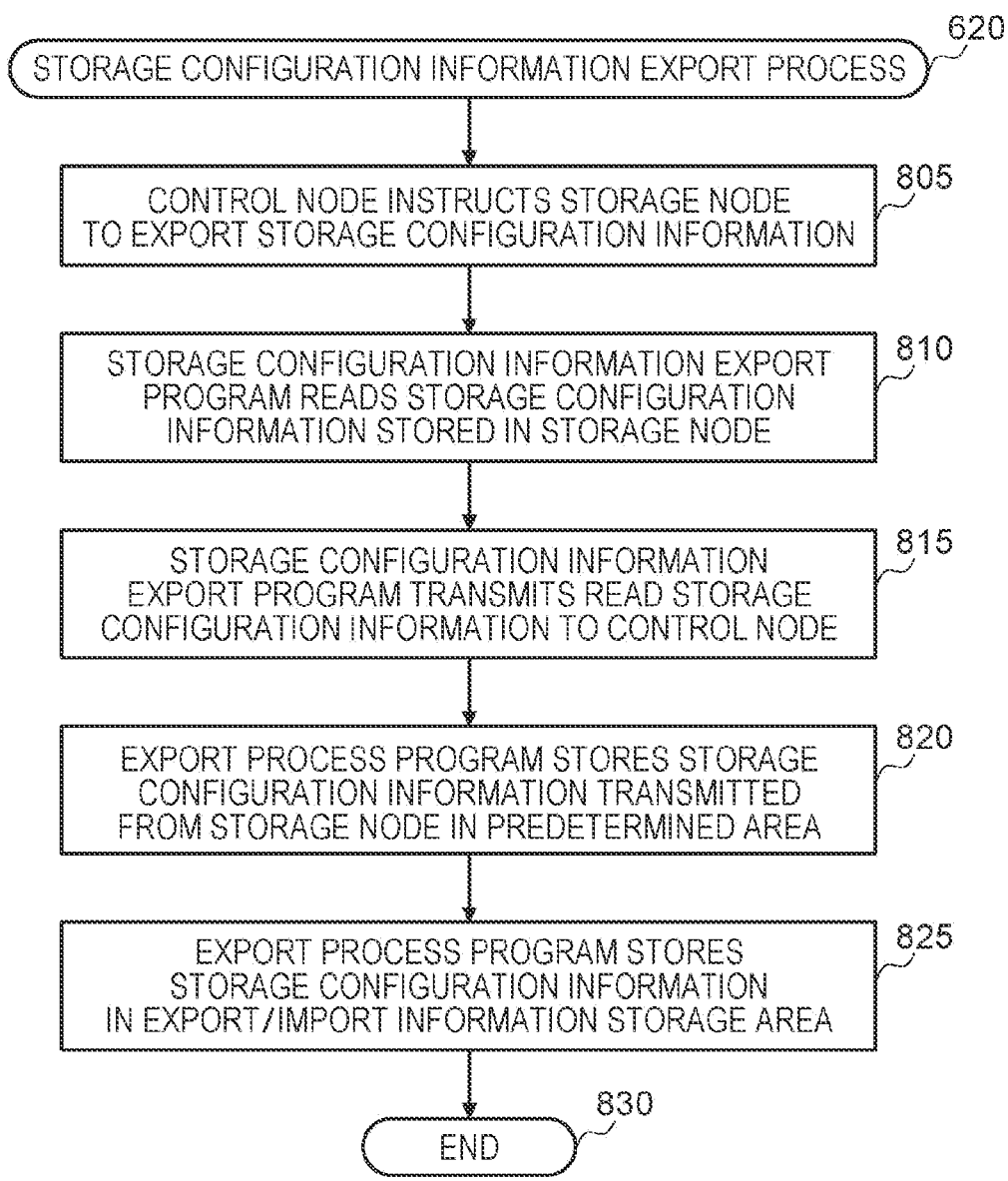
FIG. 8 is a flowchart of a storage configuration information export process.

FIG. 8 is a flowchart of the storage configuration information export process. According to this procedure, the storage configuration information of the storage node 130 is exported to a predetermined export/import information storage area.

In step 805, the export process program of the control node 145 instructs the storage node 130 to export the storage configuration information.

In step 810, the storage configuration information export process program of the storage node 130 reads the storage configuration information stored in the storage node 130.

In step 815, the storage configuration information export process program transmits the read storage configuration information to the control node 145.

In step 820, the export process program of the control node 145 refers to the storage destination information, and stores the storage configuration information received from the storage node 130 in a predetermined area of the control node 145.

In step 825, the export process program of the control node 145 refers to the storage destination information, stores the storage configuration information in a predetermined area of the export/import information storage area 155, and ends the storage configuration information export process.

Figure 9:
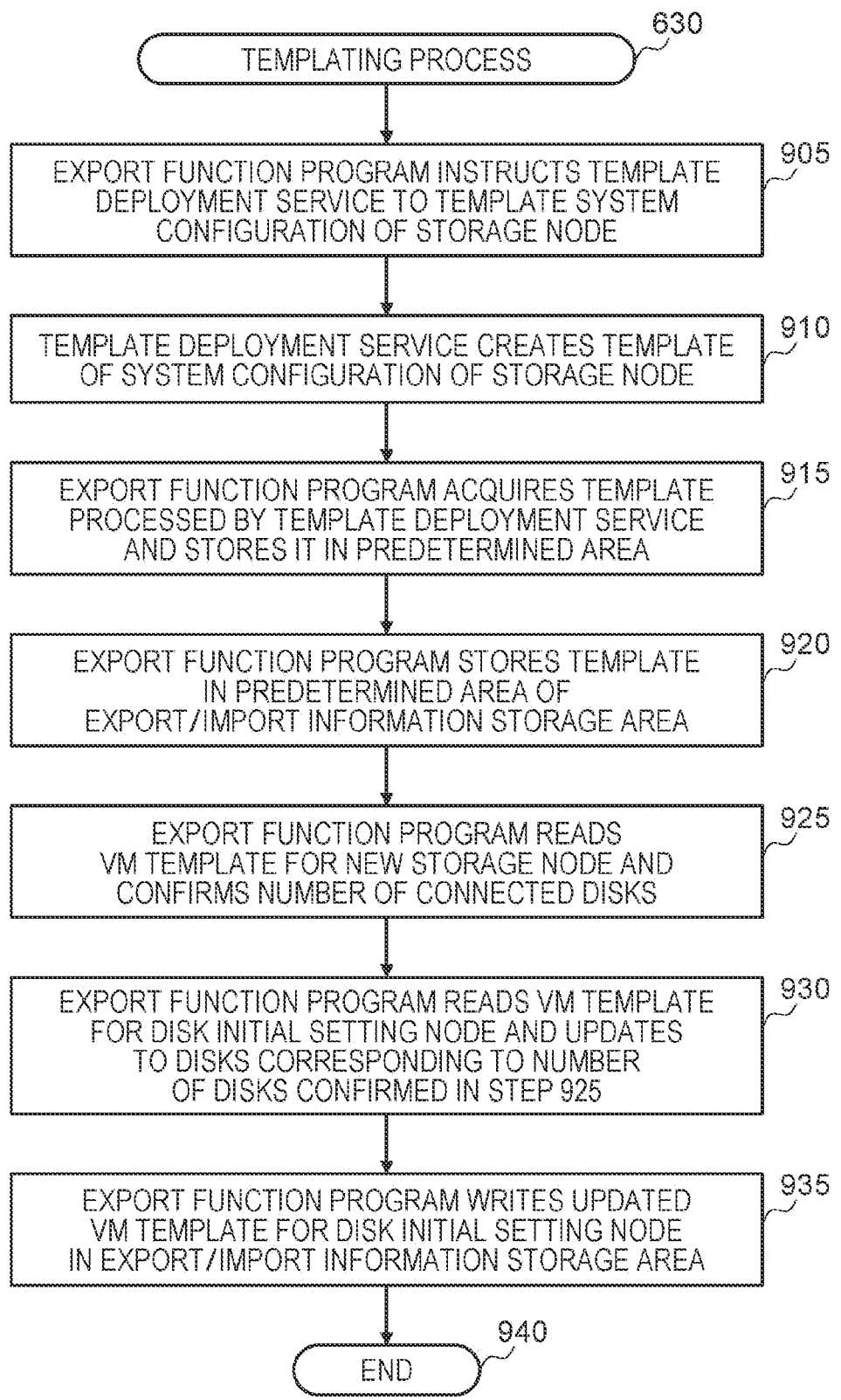
FIG. 9 is a flowchart of a templating process in the export process.

FIG. 9 is a flowchart of the templating process in the export process. According to this procedure, when the template deployment service deploys a new storage node on the cloud service, a template describing components of a necessary storage node is stored in the export/import information storage area 155.

In step 905, the export process program of the control node 145 instructs the template deployment service on the cloud service to template the storage node 130.

In step 910, the template deployment service creates a template of the storage node 130 from the setting information of the virtual machine or the disk deployed on the cloud service. In step 915, the control node 145 acquires the template and stores the template in a predetermined area of the control node 145.

In step 920, the export process program of control node 145 refers to the storage destination information, and stores the template in a predetermined area of export/import information storage area 155.

Through the above steps, the template describing the configuration information of the storage node 130 is stored in the export/import information storage area 155.

Subsequently, the process of a disk initial setting node template is performed. The reason for performing the process of the disk initial setting node template is as follows. In the present embodiment, in order to solve a problem that it takes time to perform an initial setting process for quickly making a disk connected to the new storage node 150 usable, the disk initial setting nodes 140 as many as the number of disks to be connected are deployed. The processing time is shortened by processing the initial setting of the disk by the plurality of disk initial setting nodes 140. Here, it is necessary to determine the number of disk initial setting nodes 140. Then, it is necessary to reflect it in the disk initial setting node template.

First, in step 925, the export process program of the control node 145 reads the new storage node template. Then, the number of disks is extracted from the description of the read new storage node template. As an example of extraction, "datadisks" in the description of the template is searched and the number thereof is counted. The number of "datadisks" as a result of the search is the number of disks. For example, if three "datadisks" are searched, the number of disks is three.

In step 930, the export process program of the control node 145 reads the disk initial setting node template, and writes the disk descriptions corresponding to the number of disks confirmed in step 925 to the disk initial setting node template. An example of a method of updating the template will be described. In general, since a description method is defined for the template, the method is used. For example, the disk capacity, the performance, and the like may be described as parameters, and may be added to the template by the number of disks confirmed in step 925.

In step 935, the export process program of control node 145 stores the disk initial setting node template updated in step 930 in the export/import information storage area 155, and ends the templating process.

Figure 10:
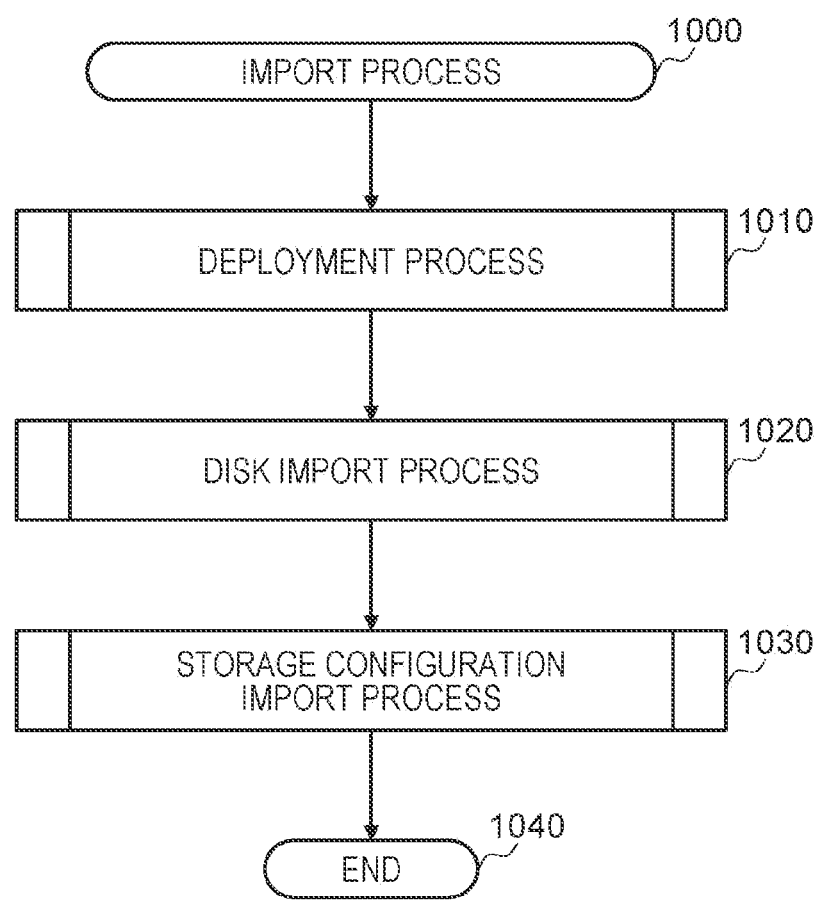
FIG. 10 is a flowchart of an import process 1000 by an import function program of the control node.

FIG. 10 is a flowchart of an import process 1000 by the import function program of the control node 145.

The import process 1000 includes a deployment process 1010, a disk import process 1020, and a storage configuration import process 1030. The import process 1000 ends when these processes are completed. Note that for the order of these processes, deployment process 1010 is first performed. The reason is that the disk import process 1020 and the storage configuration import process 1030 cannot be executed unless the new storage node 150 and the disk initial setting node 140 are deployed on the cloud service. The order of the disk import process 1020 and the storage configuration import process 1030 is not particularly limited.

Hereinafter, the deployment process 1010, the disk import process 1020, and the storage configuration import process 1030 will be described.

Figure 11:
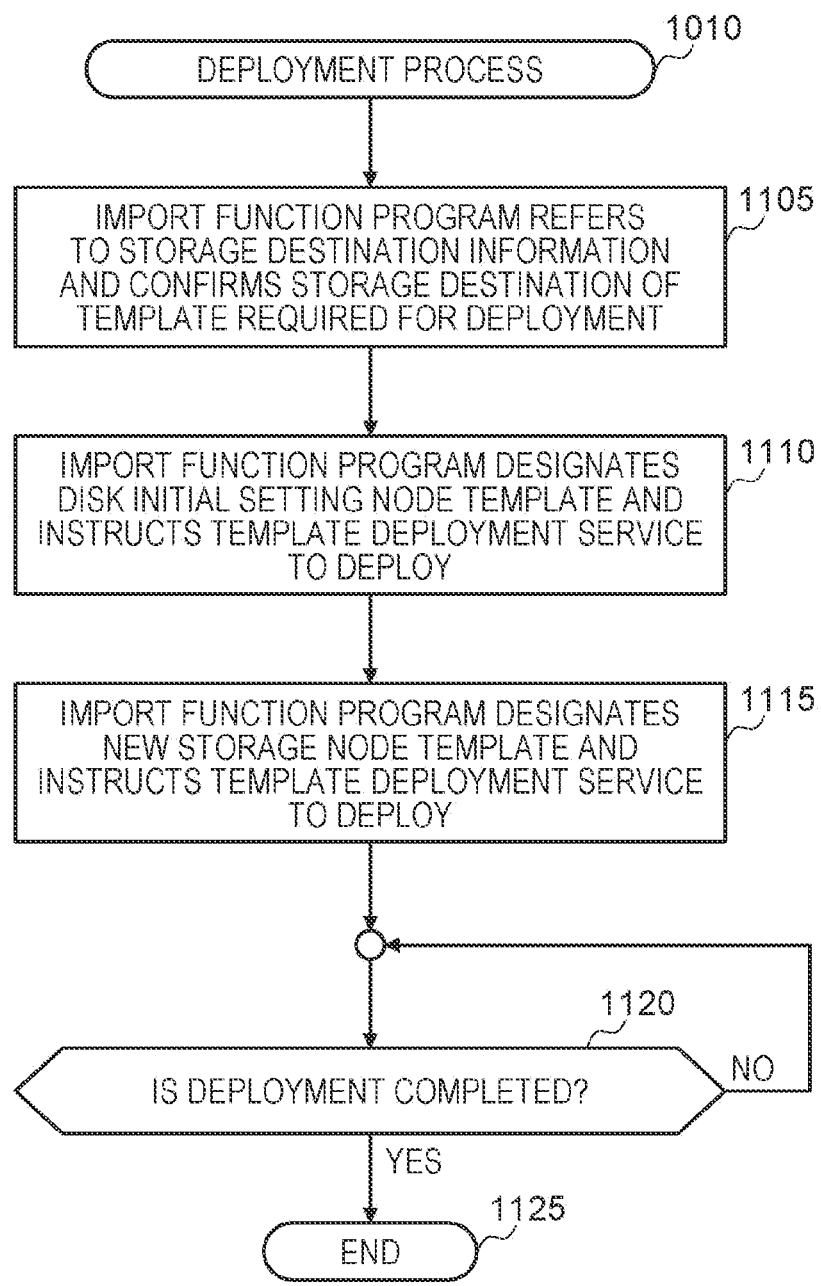
FIG. 11 is a flowchart of a deployment process 1010 in the import process 1000.

FIG. 11 is a flowchart of the deployment process 1010 in the import process 1000. According to this procedure, the template deployment service deploys the new storage node 150 and the disk initial setting node 140 on the cloud service using the new storage node template, and the disk initial setting node template stored in the export/import information storage area 155.

In step 1105, the import function program of the control node 145 refers to the storage destination information and confirms the storage destination of the template.

In step 1110, the import function program of the control node 145 designates a disk initial setting node template, and instructs the template deployment service to deploy the disk initial setting node 140 on the cloud service.

In step 1115, the import function program of the control node 145 designates a new storage node template, and instructs the template deployment service to deploy the new storage node 150 on the cloud service.

In step 1120, in a case where the deployment of the disk initial setting node 140 and the new storage node 150 on the cloud service is completed (Yes), the deployment process 1010 ends. In a case where the deployment of the disk initial setting node and the new storage node on the cloud service is not completed in step 1120 (No), the process waits until the deployment is completed.

Figure 12:
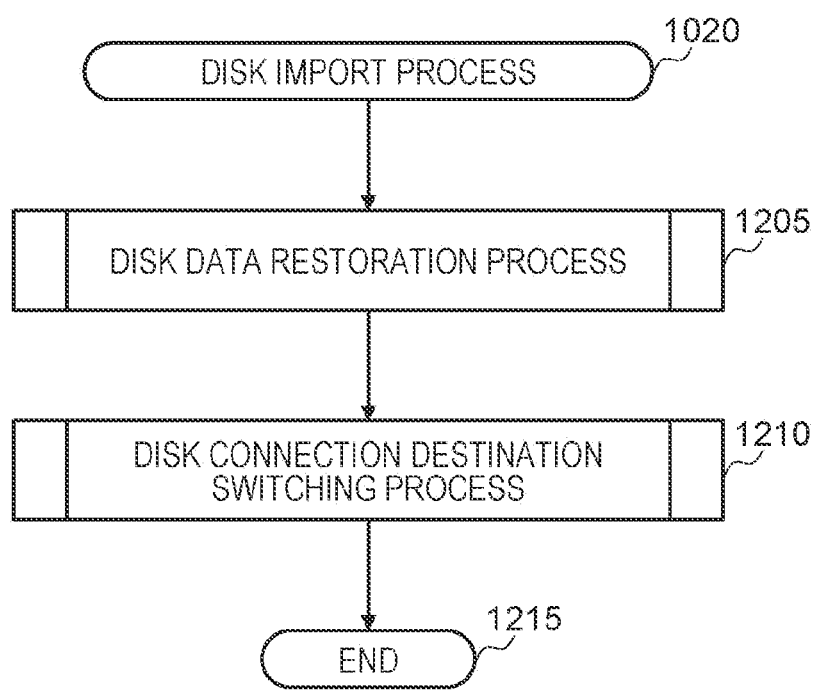
FIG. 12 is a flowchart of a disk import process 1020 in the import process 1000.

FIG. 12 is a flowchart of the disk import process 1020 in the import process 1000. The disk import process 1020 includes a disk data restoration process 1205 and a disk connection destination switching process 1210. Details of the disk data restoration process 1205 and the disk connection destination switching process 1210 will be described below.

Figure 13:
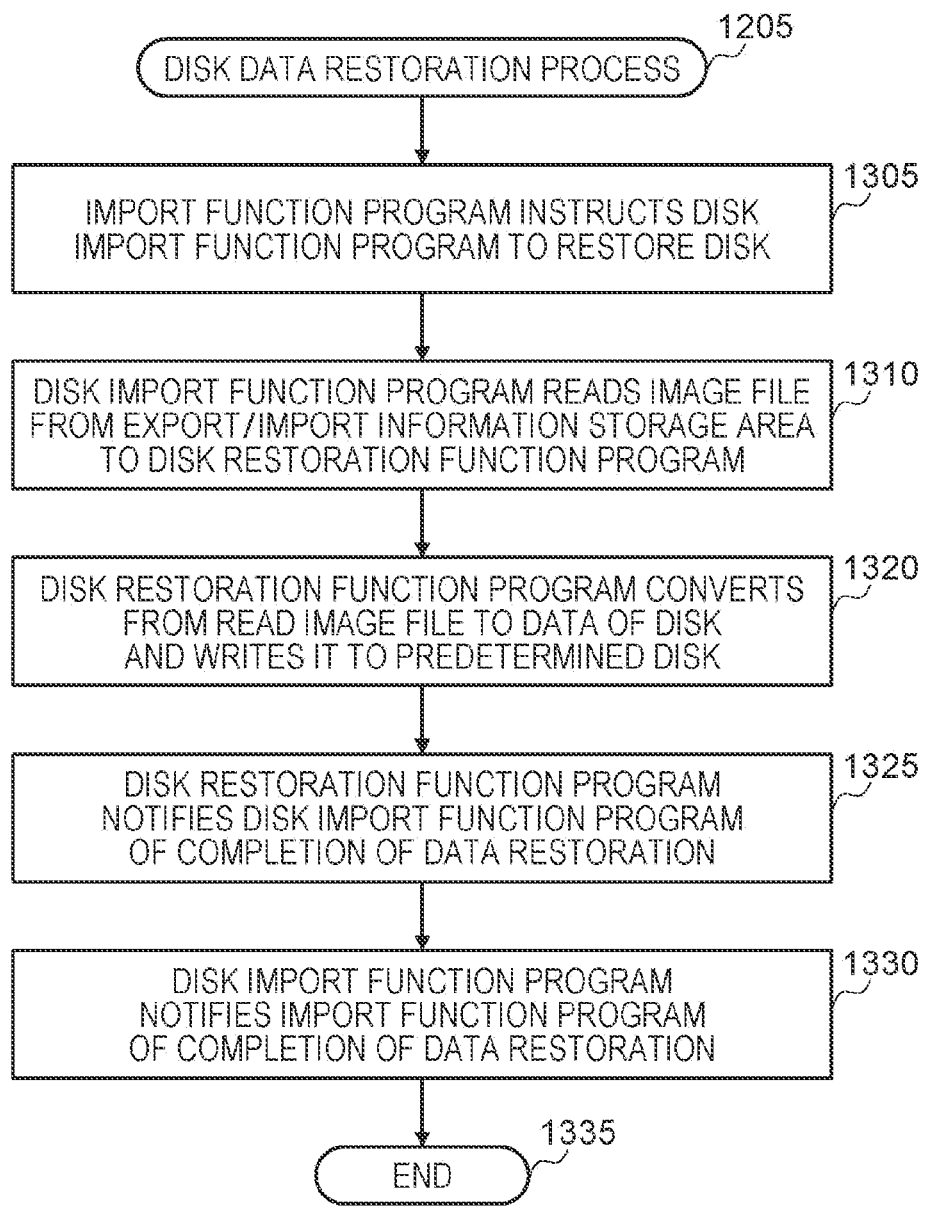
FIG. 13 is a flowchart of a disk data restoration process 1205 in the disk import process 1020.

FIG. 13 is a flowchart of the disk data restoration process 1205 in the disk import process 1020. According to this procedure, the user data and the control information stored in the disk connected to the storage node are stored in the disk connected to the initial setting node from the disk image of the disk of the storage node 130 stored in the export/import information storage area 155.

In step 1305, the import function program of the control node 145 instructs the disk initial setting node 140 to restore the disk.

In step 1310, in response to the disk restoration instruction from the control node 145, the disk import function program of the disk initial setting node 140 reads the disk image from the export/import information storage area 155 and stores the disk image in a predetermined area of the disk initial setting node 140.

In step 1320, the disk import function program of the disk initial setting node 140 instructs the disk restoration program to decompress the disk image. As a result, the user data and the control information of the disk connected to the storage node are once deployed in the disk initial setting node.

In step 1325, the disk restoration program of the disk initial setting node 140 writes the user data and the control information deployed in the disk initial setting node 140 in step 1320 to the disk connected to the disk initial setting node 140.

In step 1330, the disk import function module of the disk initial setting node 140 notifies the control node 145 that the data restoration is completed, and ends the disk data restoration process.

The disk data restoration process 1205 is executed for the plurality of disk initial setting nodes 140. For example, in a case where there are three disk initial setting nodes 140, the process is executed for three disk initial setting nodes 140.

Figure 14:
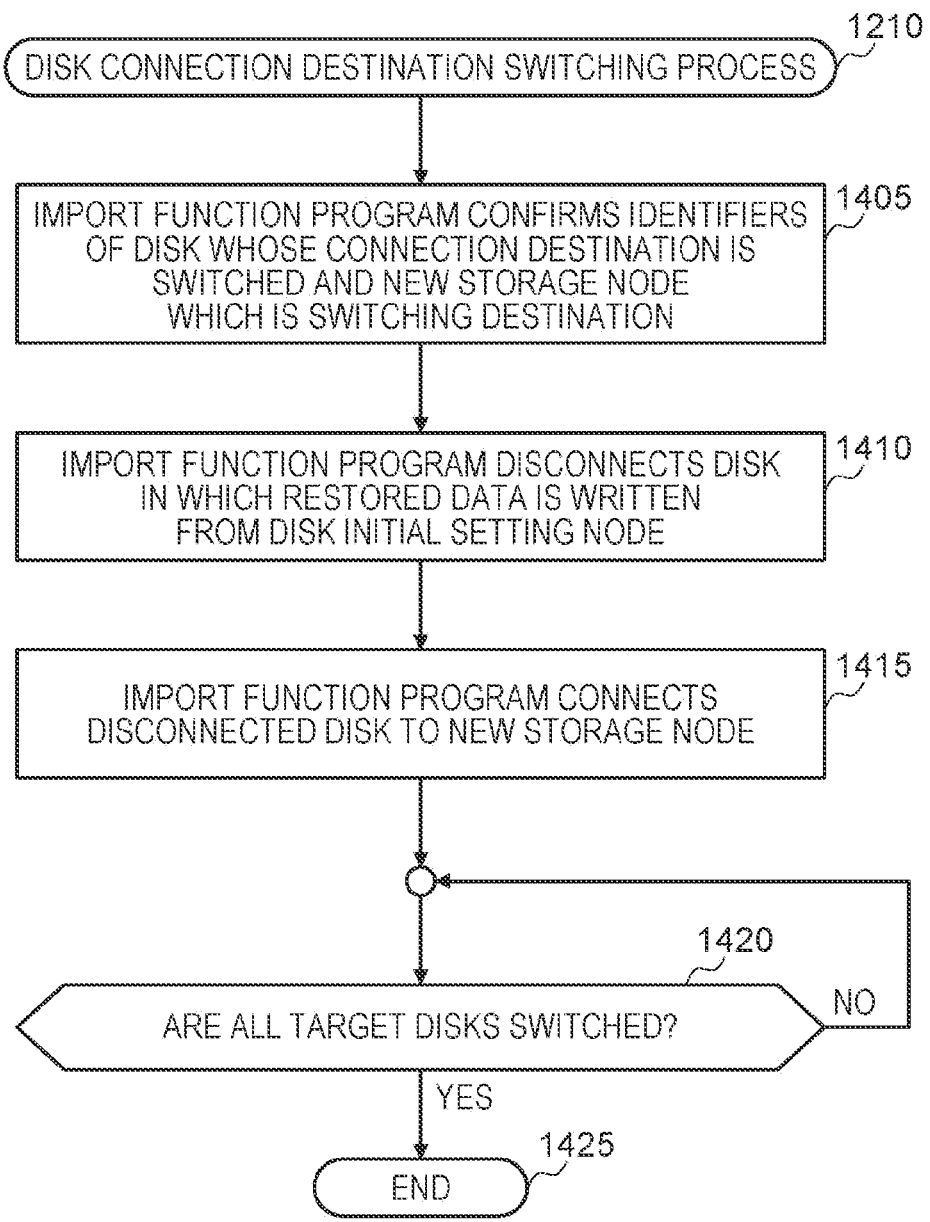
FIG. 14 is a flowchart of a disk connection destination switching process 1210 in the disk import process 1020.

FIG. 14 is a flowchart of the disk connection destination switching process 1210 in the disk import process 1020. According to this procedure, the disk connected to the disk initial setting node 140 in which the data of the disk of the storage node is restored is connected to the new storage node 150, that is, the node to which the disk is connected is switched. That is, the state of the disk of the storage node 130 and the state of the disk of the new storage node 150 become the same. As a result, an initial setting process is not performed in the new storage node 150, and the new storage node becomes usable as a system.

In step 1405, the import function program of the control node 145 refers to the connection destination information and confirms the identifier of the disk connected to the disk initial setting node 140 and the identifier of the virtual machine of the new storage node 150.

In step 1410, the import function program of the control node 145 disconnects the connection to the disk connected to the disk initial setting node 140 based on the identifier of the disk connected to the disk initial setting node 140, and brings the disk into a state of not being connected to any node.

In step 1415, the import function program of the control node 145 connects the disk disconnected in step 1410 to the virtual machine of the new storage node 150.

In step 1420, it is confirmed whether all the disks connected to the disk initial setting node 140 are connected to the new storage node 150. In a case where the connection is completed (Yes), the disk connection destination switching process ends. In a case where the connection is not completed (No), the process is repeated until the connection is completed.

Figure 15:
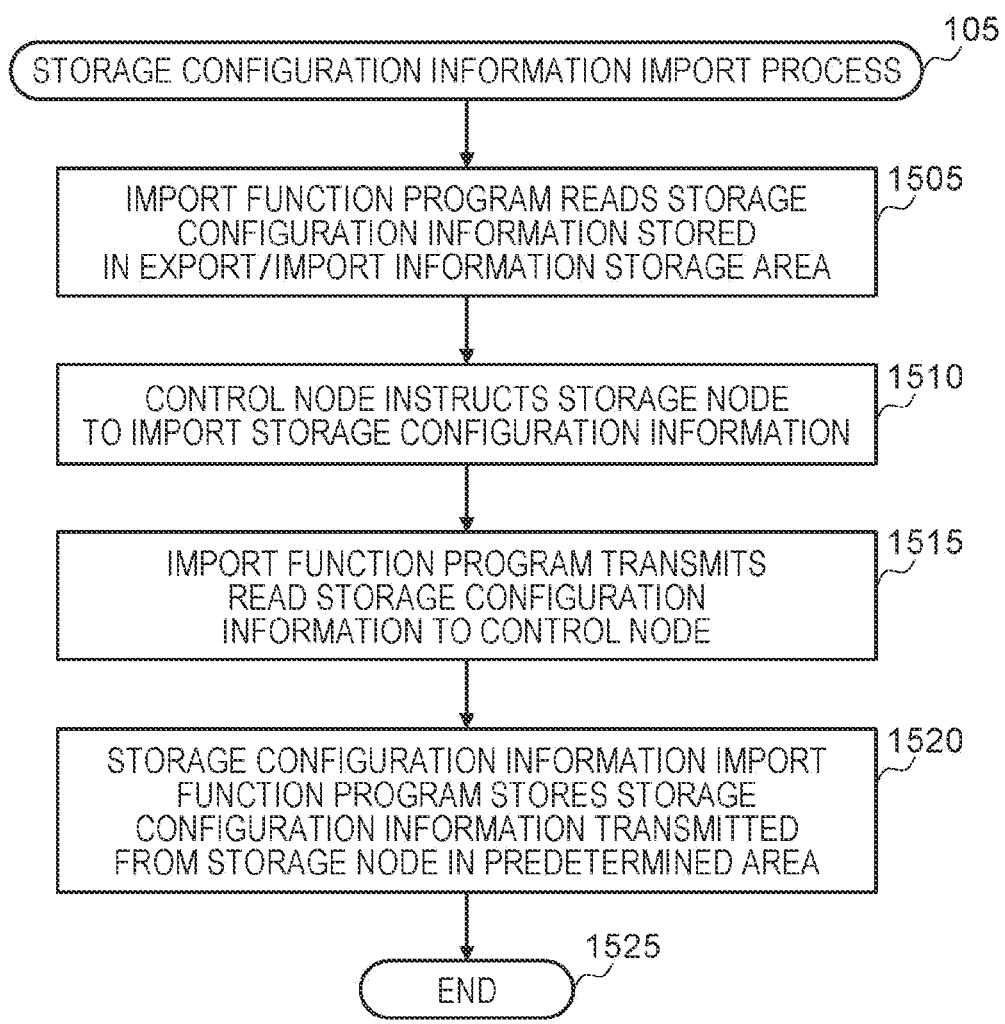
FIG. 15 is a flowchart of a storage configuration information import process in the import process.

FIG. 15 is a flowchart of the storage configuration information import process in the import process. According to this procedure, the storage configuration information of the storage node 130 is imported to the new storage node 150.

In step 1505, the import function program of the control node 145 reads the storage configuration information stored in the export/import information storage area 155.

In step 1510, the import function program of the control node 145 instructs the new storage node 150 to import the storage configuration information.

In step 1515, the import function program of the control node 145 transmits the read storage configuration information to the new storage node 150.

In step 1520, the storage configuration information import function program of the new storage node 150 stores the storage configuration information received from the control node 145 in a predetermined area of the new storage node 150, and ends the storage configuration information import process.

By implementing the flowcharts illustrated in FIG. 6 to FIG. 15, when the new storage node 150 is deployed on a cloud service as a test environment of the storage node 130, it takes time to execute a conventional script, but the functions provided by the export function and the import function program on the control node can quickly perform deployment on the cloud service.

Second Embodiment

Next, the second embodiment of the present invention will be described.

In the first embodiment, the initial setting of the disk connected to the new storage node 150 is performed using the disk image generated by the disk image generation process program of the storage node 130. In the first embodiment, the disk initial setting node 140 reads the disk image from the export/import information storage area 155 to restore the data of the disk. However, since communication occurs between the storage node 130 and the export information storage area and between the export information storage area and the disk initial setting node, communication cost and transfer time are required.

Therefore, in the second embodiment, the disk initial setting node 140 automatically generates data to be stored in the disk, a guarantee code assigned to the data, and control information, thereby suppressing the communication cost and the transfer time. It may be an option that a system provider determines some standard configurations for a user who uses the storage system, and the user selects a configuration. In this case, since the system capacity, the number of disks, and the function applied to the storage system can be known in advance, the storage location, capacity, and the like of the control information to be stored in the disk can also be known. In addition, the guarantee code attached to the data stored in the disk can be automatically generated as long as a hint (for example, a logical block address) for generating the guarantee code is known.

As described above, the disclosed system is a computer system including: a plurality of storage nodes 130 including a processor and forming a storage system using a logical storage area of one or more disks; and a control node 145 including a processor and managing the storage nodes, wherein in a case where a storage system is deployed to a new storage node, the control node 145 templates configuration information of an existing storage node 130 by using a template deployment service, the control node 145 sets a plurality of initial setting nodes (140), and causes the plurality of initial setting nodes to perform in parallel initial setting of converting and storing data of the existing storage node 130 by using the template in a plurality of disks to be connected to a new storage node (150), and the new storage node is connected to the disks in which the initial setting is performed, and imports configuration information of the existing storage so that the storage system is deployed.

Therefore, it is not necessary to execute a script for setting the configuration information, and the data to be stored in the disk, the guarantee code attached to the data, and the control information can be written at high speed, so that the time required to change the construction of the computer system can be shortened.

As an example, the control node 145 instructs the existing storage node to export data, the existing storage node transmits the data of the export target disk connected to the existing storage node to the initial setting node, the plurality of initial setting nodes restore the data to the disk connected to the initial setting node using the data received from the existing storage node, and the control node disconnects the disk on which the data restoration by the initial setting node is completed from the initial setting node and connects the disk to the new storage node.

According to this configuration, the data to be stored in the disk, the guarantee code assigned to the data, and the control information can be written at high speed using the existing storage node, and the duplication of the existing storage node is easily performed.

As an example, the initial setting node generates the data to be stored in the disk, the guarantee code assigned to the data, and the control information based on a configuration selected by a user.

According to this configuration, a storage node having a specified configuration can be easily added.

In addition, the control node 145 generates a template in which components of the existing storage node are described, and causes the new storage node to be deployed based on the template.

Therefore, for example, a virtual machine, an OS operating on the virtual machine, a system disk connected to the virtual machine, a data disk, a network interface, configuration information such as an IP address, an access control rule, and the like can be easily set.

The above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

Furthermore, some or all of the above-described configurations, functions, processing units, processing means, and the like may be realized by hardware, for example, by designing with an integrated circuit or the like. In addition, each of the above-described configurations, functions, and the like may be realized by software by a processor interpreting and executing a program for realizing each function.

Furthermore, information such as a program, a table, and a file for realizing each function may be stored in a storage device such as a memory, a hard disk, and an SSD, or a storage medium such as an IC card, an SD card, and a DVD. In addition, the control lines and the information lines indicate those necessary for the description, and do not necessarily indicate all the control lines and the information lines on the product. In practice, it may be considered that almost all the configurations are connected to each other.

Further, in the above embodiment, the duplication of the existing storage node has been described as an example, but the present invention is not limited to the duplication and can be applied to other process. In addition, the data exported from the existing storage node can be transmitted through an arbitrary path. In the above embodiment, the disk export and import process using the disk image of the disk has been described, but the data stored in the disk of the storage node may be directly exported to the export/import information storage area. Further, a snapshot of an existing storage node may be used by using a snapshot function provided by a cloud vendor instead of a disk image of a disk.

What is claimed is:

1. A computer system comprising:
 a plurality of storage nodes including a processor and forming a storage system using a logical storage area of one or more disks; and
 a control node including a processor and managing the storage nodes,
  wherein in a case where a storage system is deployed to a new storage node,
 the control node templates configuration information of an existing storage node by using a template deployment service,
 the control node sets a plurality of initial setting nodes, and causes the plurality of initial setting nodes to perform in parallel initial setting of converting and storing data of the existing storage node by using the template in a plurality of disks to be connected to a new storage node, and
 the new storage node is connected to the plurality of disks in which the initial setting is performed, and imports configuration information of the existing storage so that the storage system is deployed.

2. The computer system according to claim 1, wherein the control node instructs the existing storage node to export data,
 the existing storage node transmits data of an export target disk connected to the existing storage node to the initial setting nodes,
 the plurality of initial setting nodes restore data to a disk connected thereto by using data received from the existing storage node, and
 the control node separates a disk on which data restoration by the initial setting nodes is completed from the initial setting nodes and connects the disk to the new storage node.

3. The computer system according to claim 1, wherein the initial setting nodes generate data to be stored in the plurality of disks, a guarantee code assigned to the data, and control information based on a configuration selected by a user.

4. A management method of a computer system including a plurality of storage nodes including a processor and forming a storage system using a logical storage area of one or more disks, and a control node including a processor and managing the storage nodes, wherein in a case where a storage system is deployed to a new storage node,
 the control node templates configuration information of an existing storage node by using a template deployment service, the control node sets a plurality of initial setting nodes, and causes the plurality of initial setting nodes to perform in parallel initial setting of converting and storing data of the existing storage node by using the template in a plurality of disks to be connected to a new storage node, and the new storage node is connected to the plurality of disks in which the initial setting is performed, and imports configuration information of the existing storage so that the storage system is deployed.

* * * * *